(12) United States Patent
Miyazaki et al.

(10) Patent No.: US 8,551,357 B2
(45) Date of Patent: Oct. 8, 2013

(54) COMPOSITE FILM AND METHOD FOR MANUFACTURING A COMPOSITE FILM

(75) Inventors: Junzo Miyazaki, Ibaraki (JP); Tetsuo Inoue, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1 day.

(21) Appl. No.: 13/380,237

(22) PCT Filed: Feb. 17, 2010

(86) PCT No.: PCT/JP2010/052351
§ 371 (c)(1),
(2), (4) Date: Dec. 22, 2011

(87) PCT Pub. No.: WO2011/007592
PCT Pub. Date: Jan. 20, 2011

(65) Prior Publication Data
US 2012/0091393 A1    Apr. 19, 2012

(30) Foreign Application Priority Data

Jul. 14, 2009   (JP) .................................. 2009-165251

(51) Int. Cl.
| | | |
|---|---|---|
| C09K 19/52 | (2006.01) | |
| C09K 19/06 | (2006.01) | |
| G02B 5/30 | (2006.01) | |
| G02B 27/28 | (2006.01) | |
| G02B 1/10 | (2006.01) | |
| B29C 65/00 | (2006.01) | |
| B32B 37/00 | (2006.01) | |
| B05D 5/06 | (2006.01) | |
| C03C 17/00 | (2006.01) | |

(52) U.S. Cl.
USPC .............. 252/299.01; 252/299.6; 359/487.06; 156/229; 427/162; 427/163.1

(58) Field of Classification Search
USPC .................. 252/299.01, 299.6; 427/162, 163; 359/487.06; 156/229
See application file for complete search history.

(56) References Cited

U.S. PATENT DOCUMENTS

2010/0039608 A1    2/2010   Matsuda et al.

FOREIGN PATENT DOCUMENTS

| | | |
|---|---|---|
| JP | 2002-048918 A | 2/2002 |
| JP | 2003-255130 A | 9/2003 |
| JP | 2004-144838 A | 5/2004 |
| JP | 2008-175837 A | 7/2008 |
| WO | 2009/084317 A1 | 7/2009 |

OTHER PUBLICATIONS

Japanese Office Action dated Aug. 20, 2012, issued in correseponding Japanese Patent Application No. 2009-165251 (3 pages).
International Search Report of PCT/JP2010/052351, mailing date Mar. 30, 2010.

*Primary Examiner* — Geraldina Visconti
(74) *Attorney, Agent, or Firm* — Westerman, Hattori, Daniels & Adrian, LLP

(57) ABSTRACT

There is provided a method for manufacturing a thin polarizing film having an absorption axis oblique to a width direction of the film which comprises the steps of: performing an orientation treatment in two directions in a plane of a support film; applying a solution containing a lyotropic liquid crystal compound onto a surface of the support film; and causing a column-shaped aggregate of the lyotropic liquid crystal compound to be oriented in a direction (orientation direction) equal to the vector sum of a direction of first orientation treatment and a direction of second orientation treatment.

5 Claims, 2 Drawing Sheets

PRIOR ART

COMPOSITE FILM AND METHOD FOR MANUFACTURING A COMPOSITE FILM

BACKGROUND OF THE INVENTION

1. Field of the Invention

The present invention relates to a method for manufacturing a composite film including a polarizing film and a support film, and a composite film obtained by the manufacturing method.

2. Description of the Related Art

A polarizing film is generally manufactured by stretching a film on which a dichroic material is adsorbed. A stretching direction of the polarizing film is generally a longitudinal direction or a width direction of the film due to restrictions of a stretching apparatus. When the film is stretched in a longitudinal direction, the absorption axis is directed in the longitudinal direction, whereas when stretched in a width direction, the absorption axis is directed in the width direction. In either case, the absorption axis is parallel to or perpendicular to the width direction of the film, and cannot be oblique to the width direction. The phrase "the absorption axis is oblique to the width direction" means that the absorption axis is neither parallel to nor perpendicular to the width direction.

However, there may be cases where a polarizing film having an absorption axis oblique to the width direction is higher in the rate of utilization. Therefore, in order to attain the polarizing film having an absorption axis oblique to the width direction, there is known a manufacturing method of obliquely stretching the film by use of a special tenter stretching apparatus (for example, Japanese Unexamined Patent Publication No. 2004-144838).

A polarizing film having an absorption axis oblique to the width direction, which is obtained by such a manufacturing method, has less portions to be disposed at the time of punching and the rate of utilization thereof is high. However, in a conventional oblique stretching method, it is difficult to produce a thin (e.g., a thickness of 10 µm) polarizing film since the film tends to break in stretching.

On the other hand, there is a manufacturing method of a polarizing film different from the film stretching method, in which a liquid crystal compound is applied onto a support film in a thin film form and the liquid crystal compound is oriented to turn the thin film into a polarizing film.

In reference to FIG. 2, this manufacturing method will be described. A plurality of lyotropic liquid crystal compounds 31 are stacked in a solution with their absorption axes (major axes of molecules) 32 directed parallel to one another to form column-shaped aggregates 33.

The column-shaped aggregates 33 in a solution have the property of lining parallel to a direction 36 of orientation treatment of the support film 35 when a solution containing a lyotropic liquid crystal compound is applied onto the support film 35 in a thin film form. Therefore, an orientation direction 37 of the column-shaped aggregate 33 is parallel to the direction 36 of orientation treatment. Since the direction 36 of orientation treatment of the support film 35 is generally a longitudinal direction 38, the orientation direction 37 of the column-shaped aggregates 33 is the longitudinal direction 38 of the support film 35.

In this case, since the absorption axis 32 (major axis of a molecule) of the lyotropic liquid crystal compound 31 is perpendicular to the orientation direction 37, the absorption axis 32 is perpendicular to the longitudinal direction 38 of the support film 35. Therefore, the absorption axis 32 is parallel to a width direction 39 of the support film 35.

A polarizing film 40 is prepared by orienting many column-shaped aggregates 33 to be formed into a thin film. A composite film 30 is a laminate including the support film 35 and the polarizing film 40.

A thin (e.g., a thickness of 10 µm or less) polarizing film 40 can be easily obtained by using this manufacturing method. In the meantime, a conventional manufacturing method cannot give a polarizing film 40 in which the absorption axis 32 is oblique to the width direction 39 of the support film 35.

SUMMARY OF THE INVENTION

A polarizing film having an absorption axis oblique to the width direction of the film can be obtained by a conventional oblique stretching method. However, it is difficult to obtain a thin (e.g., a thickness of 10 µm) polarizing film since the film tends to break in stretching.

A thin (e.g., a thickness of 10 µm or less) polarizing film 40 can be easily obtained by using a conventional manufacturing method in which a liquid crystal compound 31 is applied onto a support film 35 in a thin film form and is oriented to turn the thin film into a polarizing film 40. However, such a method cannot give a polarizing film 40 in which the absorption axis 32 is oblique to the width direction 39 of the support film 35.

It is an object of the present invention to realize a polarizing film which has an absorption axis oblique to the width direction and is thin (e.g., a thickness of 10 µm or less).

In a first preferred aspect, there is provided a method for manufacturing a composite film including a support film and a polarizing film having an absorption axis oblique to a width direction of the support film. The present invention includes step A and step B. In step A, an orientation treatment is performed in different two directions in a plane of the support film. In step B, a solution containing a lyotropic liquid crystal compound for forming a column-shaped aggregate in a solution, is applied onto an orientation-treated surface of the support film to orient the column-shaped aggregate to form a polarizing film.

In a second preferred aspect of the manufacturing method according to the present invention, an angle formed by the orientation treatment in two directions is 30° to 150°.

In a third preferred aspect, a composite film according to the present invention is manufactured by the manufacturing method described above.

In a fourth preferred aspect of the composite film according to the present invention, the lyotropic liquid crystal compound is an azo compound represented by the general formula (1):

[Chemical formula 1]

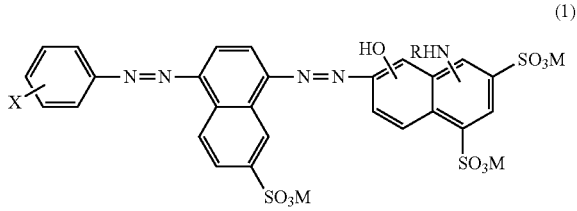

wherein R represents a hydrogen atom, an alkyl group having 1 to 3 carbon atoms, an acetyl group, a benzoyl group or a phenyl group optionally having a substituent, M represents a counterion, and X represents a hydrogen atom, a halogen atom, a nitro group, a cyano group, an alkyl group having 1 to 4 carbon atoms, an alkoxy group having 1 to 4 carbon atoms or a —SO$_3$M group.

In a fifth preferred aspect of the composite film according to the present invention, the lyotropic liquid crystal compound is an azo compound represented by the structural formula (2):

[Chemical formula 2]

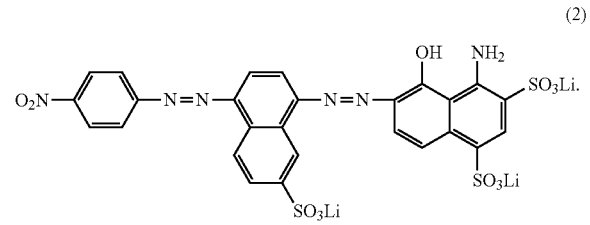

(2)

The inventors of the present invention carried out extensive investigations to solve the above-mentioned problems. The results will be described in reference to FIG. 1. In the manufacturing method of the present invention, first, a surface of a support film 11 is oriented in different two directions. These directions are referred to as a direction 12 of first orientation treatment and a direction 13 of second orientation treatment. The surface of the support film 11 may be oriented first in either the direction 12 of first orientation treatment or the direction 13 of second orientation treatment.

Next, a solution containing a lyotropic liquid crystal compound 14 is applied onto the surface of the support film 11. The lyotropic liquid crystal compound 14 forms column-shaped aggregates 15 in the solution. The column-shaped aggregates 15 are oriented in a direction (orientation direction 16) equal to the vector sum of the direction 12 of first orientation treatment and the direction 13 of second orientation treatment. An absorption axis 17 of the lyotropic liquid crystal compound 14 is perpendicular to an orientation direction 16 of the column-shaped aggregates 15.

By using this property of orientation of the column-shaped aggregates 15, a polarizing film 18 in which the absorption axis 17 is oblique to a width direction 19 can be formed on the support film 11. The absorption axis 17 is also oblique to a longitudinal direction 20.

Many column-shaped aggregates 15 are formed into a thin film to form a polarizing film 18. The composite film 10 of the present invention is a laminate including the support film 11 and the polarizing film 18.

ADVANTAGES OF THE INVENTION

In the manufacturing method of the present invention, first, a surface of the support film 11 is oriented in two directions (the direction 12 of first orientation treatment and the direction 13 of second orientation treatment). Next, a solution containing the lyotropic liquid crystal compound 14 is applied onto the surface of the support film 11. The column-shaped aggregates 15 of the lyotropic liquid crystal compound 14 are oriented in a direction (orientation direction 16) equal to the vector sum of the direction 12 of first orientation treatment and the direction 13 of second orientation treatment.

In this way, the polarizing film 18 in which the absorption axis 17 is oblique to the width direction 19 can be formed on the support film 11.

The polarizing film 18 can be peeled from the support film 11 for use. In this case, the polarizing film 18 can contribute to thinning of various optical devices as a polarizing film thinner than conventional polarizing films.

DESCRIPTION OF THE PREFERRED EMBODIMENTS

[Manufacturing Method of the Present Invention]

Figure 1:
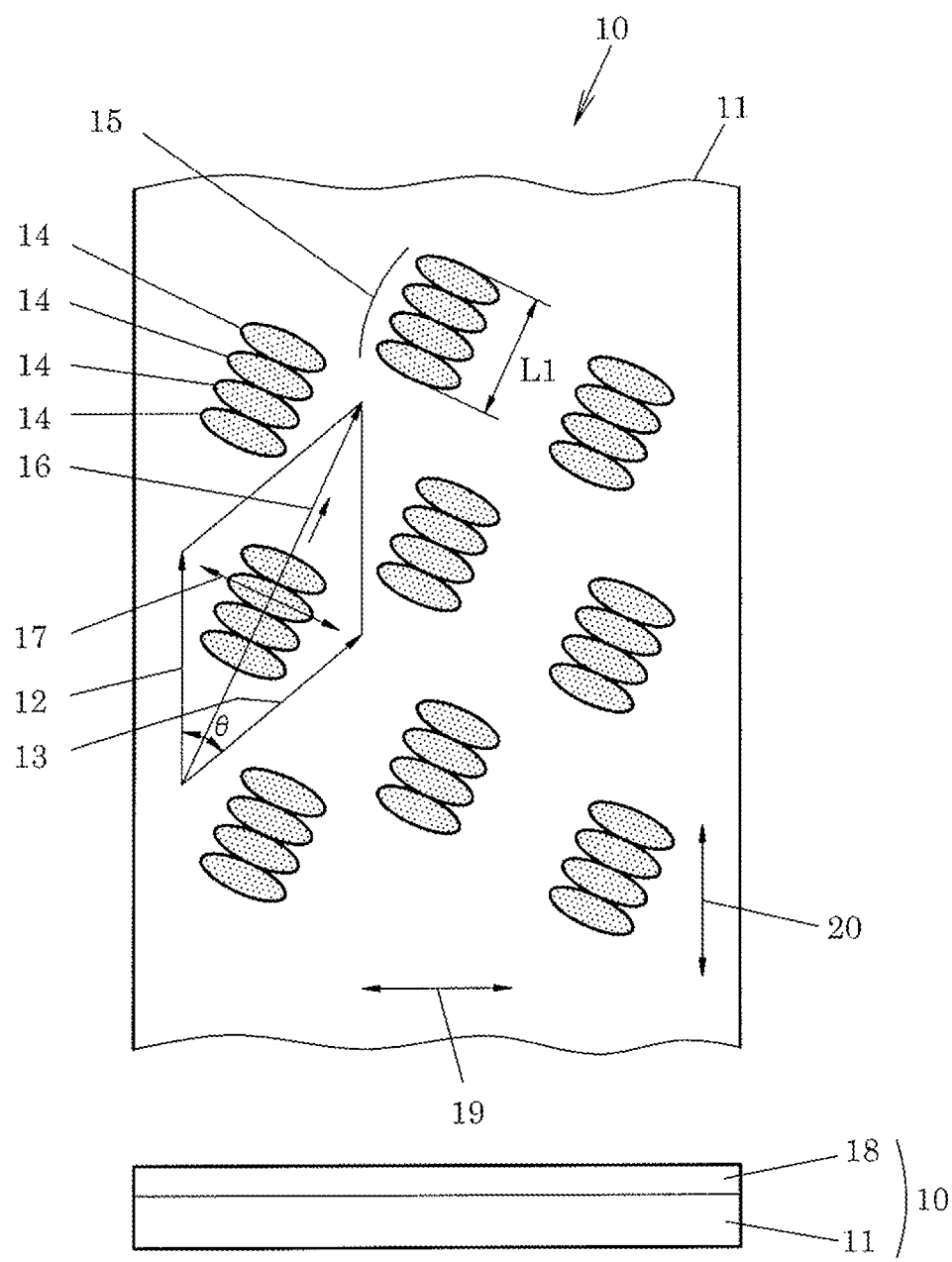
FIG. 1 is a schematic view of a composite film of the present invention.
Figure 2:
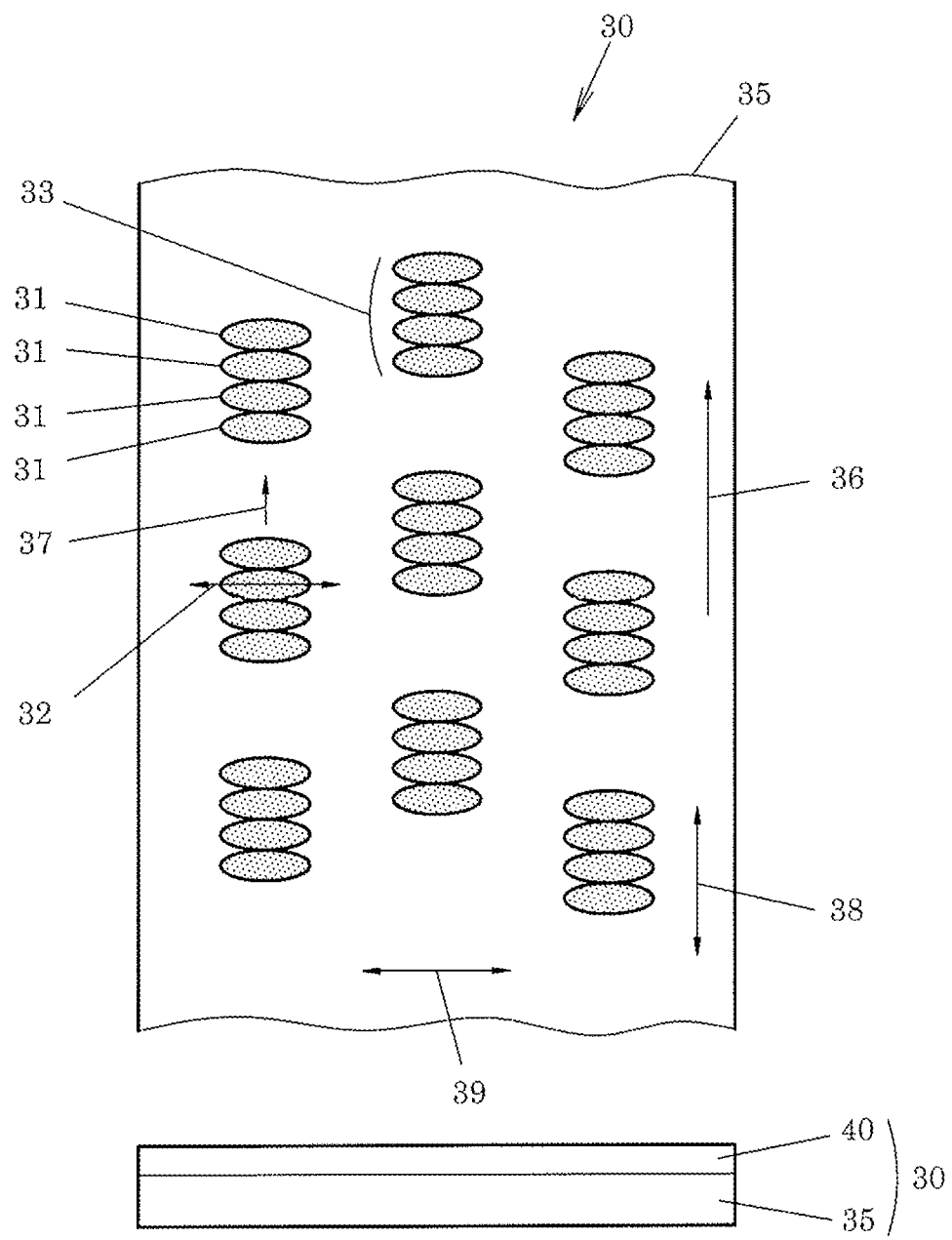
FIG. 2 is a schematic view of a conventional composite film.

The present invention relates to a method for manufacturing a composite film 10 in which a polarizing film 18 having an absorption axis 17 different in the direction from a width direction 19 of a support film 11 is laminated on the support film 11. The manufacturing method of the present invention includes step A and step B.

In step A, a surface of the support film 11 is oriented in two directions. The two directions refer to a direction 12 of first orientation treatment and a direction 13 of second orientation treatment.

In step B, a solution containing a lyotropic liquid crystal compound 14 is applied onto the surface of the support film 11. The lyotropic liquid crystal compound 14 forms column-shaped aggregates 15 in the solution. The column-shaped aggregates 15 are oriented in a direction (orientation direction 16) equal to the vector sum of the direction 12 of first orientation treatment and the direction 13 of second orientation treatment.

The manufacturing method of the present invention may include other steps besides step A and step B. Examples of such steps include a step of drying an oriented layer (polarizing film 18) of the lyotropic liquid crystal compound 14 after step B.

[Step A]

In step A, the surface of the support film 11 is oriented in two directions. The two directions refer to the direction 12 of first orientation treatment and the direction 13 of second orientation treatment.

The support film 11 supports the polarizing film 18 from one side thereof. Materials of the support film 11 are not particularly limited, and examples thereof include polyester resins, cellulose resins, cycloolefin resins and acrylic resins.

The support film 11 may be a single layer film, or may be a multilayer film in which a polymer film of polyimide, polyvinyl alcohol or the like is applied onto the single layer film. The overall thickness of the support film 11 is preferably 10 μm to 200 μm.

Examples of the orientation treatment include a rubbing treatment, an oblique deposition treatment, and a plasma treatment. These orientation treatments are described in, for example, "Ekisho No Kiso To Ouyo" (Liquid Crystals: Fundamentals and Applications), edited by S. Matsumoto and I. Tsunoda, 1991, published by Kogyo Chosakai Publishing Co., Ltd.

Examples of a method of orienting a film in different two directions in a plane include the following methods:

(a) A rubbing treatment is performed in different two directions.

(b) After an oblique deposition treatment, a rubbing treatment is performed in a direction different from the direction of the oblique deposition.

(c) One of two rubbing films which have been respectively rubbed in different directions is overlaid on the other in such a way that surfaces subjected to a rubbing treatment are opposed to each other, and the orientation regulation force of one of the rubbing films is transferred to the other rubbing film.

When the orientation treatments applied to the support film 11 in the two directions are referred to as a first orientation treatment (in the direction 12) and a second orientation treatment (in the direction 13), an angle θ which the first orientation treatment 12 forms with the second orientation treatment 13 is preferably 30° to 150°.

[Step B]

In step B, a solution containing a lyotropic liquid crystal compound 14 is applied onto the orientation-treated surface of the support film 11 obtained in step A to form a polarizing film 18. The lyotropic liquid crystal compound 14 forms column-shaped aggregates 15 in the solution. Many column-shaped aggregates 15 are formed into a thin film to form a polarizing film 18. A laminate including the support film 11 and the polarizing film 18 constitutes the composite film 10 of the present invention.

In the present invention, the "lyotropic liquid crystal compound" is a liquid crystal compound which is dissolved in a solvent to form a liquid crystal compound solution, which causes a phase-change from an isotropic phase to a liquid crystal phase (or vice versa) by a change in the concentration in the solution.

The solution of the lyotropic liquid crystal compound can be oriented in one direction by being applied onto the orientation-treated surface in a state of an isotropic phase or in a state of a liquid crystal phase.

Lyotropic liquid crystal compounds are stacked with major axes of molecules (absorption axes 17) directed transversely, and thereby form a column-shaped aggregate 15. A length $L_1$ of the column-shaped aggregate 15 determined by X-ray diffraction is preferably 4 nm to 9 nm.

The lyotropic liquid crystal compound 14 is not particularly limited as long as it exhibits the above-mentioned properties, and for example, azo compounds, anthraquinone compounds, perylene compounds, quinophthalone compounds, naphthoquinone compounds, and merocyanine compounds are used as the lyotropic liquid crystal compound.

As the lyotropic liquid crystal compound 14 to be used in the present invention, an azo compound represented by the general formula (1) is suitable. The azo compound represented by the general formula (1) exhibits stable liquid crystallinity in a solution and has an excellent orientation property.

[Chemical formula 1]

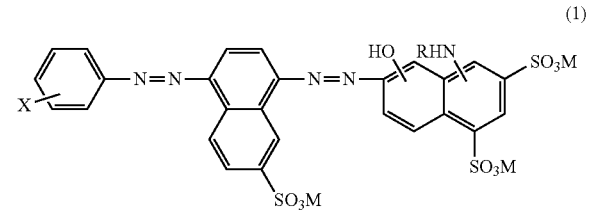

(1)

In the general formula (1), R represents a hydrogen atom, an alkyl group having 1 to 3 carbon atoms, an acetyl group, a benzoyl group or a phenyl group optionally having a substituent. M represents a counterion and is preferably a hydrogen atom, an alkali metal atom or an alkaline earth metal atom. X represents a hydrogen atom, a halogen atom, a nitro group, a cyano group, an alkyl group having 1 to 4 carbon atoms, an alkoxy group having 1 to 4 carbon atoms or a —SO$_3$M group.

The azo compound represented by the general formula (1) can be obtained by, for example, diazotizing and coupling an aniline derivative and a naphthalenesulfonic acid derivative through an ordinary process to form a monoazo compound and then further diazotizing the monoazo compound and coupling the compound with an aminonaphthol disulfonic acid derivative.

The solution to be used in the present invention contains the lyotropic liquid crystal compound 14 and a solvent in which this compound is dissolved. The concentration of the lyotropic liquid crystal compound 14 is preferably 1% to 15% by weight with respect to the overall weight of the solution.

Any coater is used for application of the solution. The coater is, for example, a coater having a tensioned-web die, a slot die, a wire bar or a curtain roll.

The polarizing film 18 obtained in step B contains the lyotropic liquid crystal compound 14, and the column-shaped aggregates 15 made of the lyotropic liquid crystal compound 14 are oriented in one direction.

The polarizing film 18 exhibits absorption dichroism in a visible light region (wavelength: 380 nm to 780 nm). The thickness of the polarizing film 18 is preferably 0.1 μm to 5 μm.

The polarizing film 18 is preferably dried in such a way that the content of the solvent is 50% by weight or less. Examples of a drying means in this case include natural drying, drying under a reduced pressure and drying by heating.

[Composite Film]

A composite film 10 obtained by the manufacturing method of the present invention includes a support film 11 and a polarizing film 18 having an absorption axis 17 oblique to a width direction 19 of the support film 11. The overall thickness of the composite film 10 is preferably more than 10 μm and 250 μm or less.

EXAMPLES

Synthetic Example

4-Nitroaniline and 8-amino-2-naphthalenesulfonic acid were diazotized and coupled according to an ordinary process to obtain a monoazo compound. The "ordinary process" is a method described in "Riron Seizo Senryo Kagaku (Theoretical Production, Dye Chemistry) 5th edition, Yutaka Hosoda, published on Jul. 15, 1968, GIHODO SHUPPAN Co., Ltd., pages 135 to 152.

The obtained monoazo compound was diazotized in the same manner according to an ordinary process and was further coupled with 1-amino-8-naphthol-2,4-disulfonate lithium salt to obtain a crude product containing an azo compound having a structural formula (2). The crude product was salted out with lithium chloride to obtain the azo compound having the structural formula (2):

[Chemical formula 2]

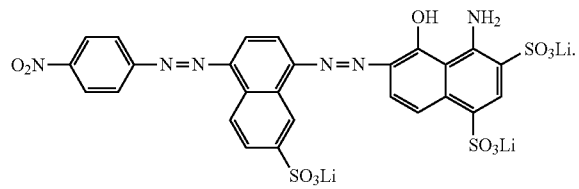

(2)

The azo compound having the structural formula (2) was dissolved in ion-exchange water to prepare a 20% by weight aqueous solution. In this aqueous solution, the azo compound forms a column-shaped aggregate and exhibits a nematic liquid crystal phase at room temperature (23° C.).

Example

A surface of a cycloolefin resin film ("ZEONOR" manufactured by Optes Inc.) having a thickness of 100 μm was subjected to a rubbing treatment by rubbing in two directions with a buff cloth made of cotton (YA-25-C manufactured by YOSHIKAWA CHEMICAL Co., Ltd.) to obtain a support film. The two directions are at angles of 40° and 90° counterclockwise with respect to the width direction of the film.

An aqueous solution (concentration: 7% by weight) containing the azo compound having the structural formula (2) was applied onto the rubbed surface of the support film, oriented, and dried to form a polarizing film having a thickness of 0.5 μm.

An orientation direction of column-shaped aggregates of the obtained polarizing film was at an angle of 65° counterclockwise with respect to the width direction of the support film. This direction was a direction equal to the vector sum of the two directions in which rubbing was performed. An absorption axis of the obtained polarizing film was perpendicular to the orientation direction of the column-shaped aggregates and was at an angle of 155° counterclockwise with respect to the width direction of the support film.

[Measuring Method]

[Thickness]

A portion of a polarizing film was peeled off and a difference in level was measured by use of a three-dimensional measurement system of the shape of a non-contact surface (Micromap MM5200 manufactured by Ryoka Systems, Inc.) to determine the thickness of the polarizing film.

[Liquid Crystal Phase]

A small amount of a lyotropic liquid crystal compound solution was sandwiched between two microscope slides and a liquid crystal phase thereof was observed by use of a polarization microscope (OPTIPHOT-POL manufactured by Olympus Corp.) with a large-size sample heating and cooling stage for microscope (10013L manufactured by Japan High Tech Co., Ltd.).

INDUSTRIAL APPLICABILITY

Uses of the polarizing film and the composite film of the present invention are not limited and they are suitably used for liquid crystal panels of liquid crystal TVs, computer displays, mobile phones, game machines, digital cameras, video cameras, car navigation systems, office automation equipment and factory automation equipment, for example.

DESCRIPTION OF THE REFERENCE NUMERALS

10: composite film; 11: support film; 12: direction of first orientation treatment; 13: direction of second orientation treatment; 14: lyotropic liquid crystal compound; 15: column-shaped aggregate; 16: orientation direction; 17: absorption axis; 18: polarizing film; 19: width direction; 20: longitudinal direction; 30: composite film; 31: lyotropic liquid crystal compound; 32: absorption axis (major axis of molecule); 33: column-shaped aggregate; 35: support film; 36: direction of orientation treatment; 37: orientation direction; 38: longitudinal direction; 39: width direction; 40: polarizing film

What is claimed is:

1. A method for manufacturing a composite film including a support film and a polarizing film having an absorption axis oblique to a width direction of the support film, comprising the steps of:

A) subjecting a surface of the support film to an orientation treatment in two different directions in a plane parallel to the surface of the support film; and B) applying a solution containing a lyotropic liquid crystal compound to form a column-shaped aggregate in a solution, onto the orientation-treated surface of the support film, wherein the column-shaped aggregate orients to form a polarizing film.

2. The method according to claim 1, wherein an angle formed by the two directions each is 30° to 150°.

3. A composite film manufactured by the manufacturing method according to claim 1 or 2.

4. The composite film according to claim 3, wherein the lyotropic liquid crystal compound is an azo compound represented by chemical formula (1):

[Chemical formula 1]

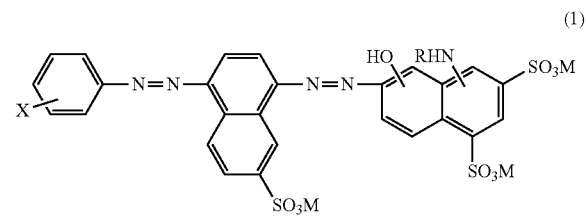

(1)

wherein R represents a hydrogen atom, an alkyl group having 1 to 3 carbon atoms, an acetyl group, a benzoyl group or a phenyl group optionally having a substituent; M represents a counterion; and X represents a hydrogen atom, a halogen atom, a nitro group, a cyano group, an alkyl group having 1 to 4 carbon atoms, an alkoxy group having 1 to 4 carbon atoms or a —$SO_3M$ group.

5. The composite film according to claim 4, wherein the lyotropic liquid crystal compound is an azo compound represented by chemical formula (2):

[Chemical formula 2]
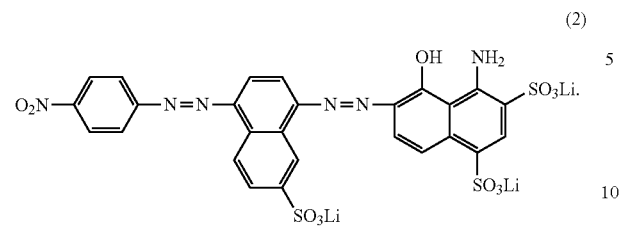
* * * * *